(12) United States Patent
Pauzauskie et al.

(10) Patent No.: US 11,913,683 B2
(45) Date of Patent: Feb. 27, 2024

(54) SOLID-STATE LASER REFRIGERATION OF COMPOSITE OPTOMECHANICAL RESONATORS

(71) Applicant: University of Washington, Seattle, WA (US)

(72) Inventors: Peter J. Pauzauskie, Seattle, WA (US); Anupum Pant, Seattle, WA (US); Xiaojing Xia, Seattle, WA (US); Elena Dobretsova, Seattle, WA (US); E. James Davis, Seattle, WA (US); Alexander B. Bard, Seattle, WA (US); Robert G. Felsted, Seattle, WA (US)

(73) Assignee: University of Washington, Seattle, WA (US)

( * ) Notice: Subject to any disclaimer, the term of this patent is extended or adjusted under 35 U.S.C. 154(b) by 409 days.

(21) Appl. No.: 17/152,572

(22) Filed: Jan. 19, 2021

(65) Prior Publication Data

US 2021/0222920 A1 Jul. 22, 2021

Related U.S. Application Data

(60) Provisional application No. 62/962,794, filed on Jan. 17, 2020.

(51) Int. Cl.
| | |
|---|---|
| *F25B 23/00* | (2006.01) |
| *H01S 3/04* | (2006.01) |
| *H01S 3/16* | (2006.01) |

(52) U.S. Cl.
CPC ............ *F25B 23/00* (2013.01); *H01S 3/0408* (2013.01); *H01S 3/1618* (2013.01); *H01S 3/1645* (2013.01)

(58) Field of Classification Search
CPC ....... F25B 23/00; H01S 3/0408; H01S 3/1618
See application file for complete search history.

(56) References Cited

U.S. PATENT DOCUMENTS

| | | |
|---|---|---|
| 4,042,527 A | 8/1977 | Kano |
| 4,829,529 A | 5/1989 | Kafka |
| 5,008,890 A | 4/1991 | McFarlane |
| 5,555,342 A | 9/1996 | Buchal |
| 9,680,278 B2 * | 6/2017 | Xiong ..................... H01S 3/04 |

(Continued)

FOREIGN PATENT DOCUMENTS

| | | |
|---|---|---|
| CN | 102494434 A | 6/2012 |
| CN | 103904163 A | 7/2014 |

(Continued)

OTHER PUBLICATIONS

Pant, "Optomechanical Thermometry of Nanoribbon Cantilevers," 2018, J. Physical Chemistry C, 122, p. 7525-7532. (Year: 2018).*

(Continued)

*Primary Examiner* — Michael Carter
(74) *Attorney, Agent, or Firm* — Christensen O'Connor Johnson Kindness PLLC

(57) ABSTRACT

An apparatus and method of indirectly cooling an optomechanical resonator, comprising impinging a laser on an optomechanical resonator attached to a substrate, wherein the optomechanical resonator comprises a cantilever, a cooling end of the cantilever, having a cooling end comprising a laser-induced cooling element, an attachment end of the cantilever, attached to a substrate, and wherein the laser has a peak wavelength in the near-infrared band.

17 Claims, 9 Drawing Sheets

(56) References Cited

U.S. PATENT DOCUMENTS

| | | | |
|---|---|---|---|
| 10,770,861 B1* | 9/2020 | Osinski | H01S 5/041 |
| 10,989,450 B1* | 4/2021 | Hehlen | H01S 3/025 |
| 2003/0207331 A1 | 11/2003 | Wilson | |
| 2012/0147906 A1 | 6/2012 | Williams | |
| 2012/0312028 A1 | 12/2012 | Kashyap | |
| 2013/0320263 A1 | 12/2013 | Riman | |
| 2017/0137684 A1* | 5/2017 | Pauzauskie | F25B 23/00 |
| 2020/0059063 A1* | 2/2020 | Digonnet | H01S 3/0672 |

FOREIGN PATENT DOCUMENTS

| | | |
|---|---|---|
| CN | 104730621 A | 6/2015 |
| CN | 105116665 A | 12/2015 |
| RU | 2007124426 | 1/2009 |

OTHER PUBLICATIONS

Yan, "Fast optical cooling of a nanomechanical cantilever by a dynamical Stark-shift gate" 2015, Scientific Reports, DOI: 10.1038/srep14977, pp. 1-9. (Year: 2015).*

Rastegar, "Nanomechanical Actuation of a Silicon Cantilever Using an Azo Dye, Self-Assembled Monolayer," 2013, Langmuir, 29, pp. 7118-7124. (Year: 2013).*

A. Ashkin (Jan. 1970) "Acceleration and trapping of particles by radiation pressure," Physical Review Letters, 24(4):156-159.

A. Ashkin et al. (May 1986) "Observation of a single-beam gradient force optical trap for dielectric particles," Optics Letters, 11(5):288-290.

A. Ashkin and J. Dziedzic (Oct. 1989) "Internal cell manipulation using infrared laser traps," Proceedings of the National Academy of Sciences USA, 86(20):7914-7918.

A. Ashkin et al. (Dec. 1987) "Optical trapping and manipulation of single cells using infrared laser beams," Nature, 330(6150):769-771.

A. Ashkin and J. Dziedzic (Mar. 1987) "Optical trapping and manipulation of viruses and bacteria," Science, 235(4795):1517-1520.

H. Liang et al. (Jan. 1993) "Micromanipulation of chromosomes in PTK2 cells using laser microsurgery (optical scalpel) in combination with laser-induced optical force (optical tweezers)," Experimental cell research, 204(1):110-120.

N. Charon et al. (Feb. 1992) "Morphology and dynamics of protruding spirochete periplasmic flagella," Journal of Bacteriology, 174(3):832-840.

PJ Pauzauskie et al. (Feb. 2006) "Optical trapping and integration of semiconductor nanowire assemblies in water," Nature Materials, 5(2):97-101.

C. Xie et al. (Feb. 2002) "Near-infrared Raman spectroscopy of single optically trapped biological cells," Optics Letters, 27(4):249-251.

LP Neukirch et al. (Aug. 2013) "Observation of nitrogen vacancy photoluminescence from an optically levitated nanodiamond," Optics Letters, 38(16):2976-2979.

LP Ghislain and WW Webb (Oct. 1993) "Scanning-force microscope based on an optical trap," Optics Letters, 18(19):1678-1680.

MJ Sailor and J-H Park (Jul. 2012) "Hybrid Nanoparticles for Detection and Treatment of Cancer," Advanced Materials, 24(28):3779-3802.

Z. Zhang et al. (Jul. 2013) "Near-Infrared Light-Mediated Nanoplatforms for Cancer Thermo-Chemotherapy and Optical Imaging," Advanced Materials, 25(28):3869-3880.

S. Berciaud et al. (Dec. 2004) "Photothermal heterodyne imaging of individual onfluorescent nanoclusters and nanocrystals," Physical Review Letters, 93(25):257402.

EC Dreaden et al. (2012; epub Nov. 2011) "The golden age: gold nanoparticles for biomedicine," Chemical Society Reviews, 41(7):2740-2779.

J. Millen et al. (Jun. 2014) "Nanoscale temperature measurements using non-equilibrium Brownian dynamics of a levitated nanosphere," Nature Nanotechnology, 9(6):425-429.

A. Kyrsting et al. (Feb. 2011) "Heat Profiling of Three-Dimensionally Optically Trapped Gold Nanoparticles using Vesicle Cargo Release," Nano Letters, 11(2):888-892.

OM Maragò et al. (Oct. 2008) "Femtonewton Force Sensing with Optically Trapped Nanotubes," Nano Letters, 8(10):3211-3216.

B. Roy et al. (Jun. 2014) "Simultaneous detection of rotational and translational motion in optical tweezers by measurement of backscattered intensity," Optics Letters, 39(11):3316-3319.

M. Capitanio et al. (Apr. 2002) "Calibration of optical tweezers with differential interference contrast signals," Review of Scientific Instruments, 73(4):1687-1696.

M. Sarshar et al. (Nov. 2014) "Comparative study of methods to calibrate the stiffness of a single-beam gradient-force optical tweezers over various laser trapping powers," Journal of Biomedical Optics, 19(11):115001, 13 pages.

G. Falasco et al. (Sep. 2014) "Effective temperatures of hot Brownian motion," Physical Review E, 90(3):032131, 10 pages.

M. Sheik-Bahae and RI Epstein (Feb. 2009) "Laser cooling of solids," Laser & Photonics Reviews, 3(1-2):67-84.

CE Mungan (Apr. 2005) "Radiation thermodynamics with applications to lasing and fluorescent cooling," American Journal of Physics, 73(4):315-322.

CE Mungan and TR Gosnell (1999; retrieved Apr. 2017) "Laser Cooling of Solids," in B. Bederson and H. Walthier (Eds.), Advances in Atomic, Molecular, and Optical Physics, 40:161-228.

C. Li (Feb. 2014) "A targeted approach to cancer imaging and therapy," Nature Materials, 13(2):110-115.

BT Draine and PJ Flatau (Apr. 1994) "Discrete-dipole approximation for scattering calculations," Journal of the Optical Society of America A, 11(4):1491-1499.

JE Baumgardner and DD Osheroff (Oct. 2004) "Phase diagram of superfluid 3He in 99.3% porosity aerogel," Physical Review Letters, 93(15):155301, 4 pages.

DV Seletskiy et al. (Aug. 2010) "Laser cooling of a semiconductor load to 165 K," Optics Express, 18(17):18061-18066.

M. Sheik-Bahae and RI Epstein (Dec. 2007) "Optical refrigeration," Nature Photonics, 1:693-699.

XL Ruan and M. Kaviany (Apr. 2006) "Enhanced laser cooling of rare-earth-ion-doped nanocrystalline powders," Physical Review B, 73:155422, 15 pages.

J. Zhao et al. (Oct. 2013) "Single-nanocrystal sensitivity achieved by enhanced upconversion luminescence," Nature Nanotechnology, 8(10):729-734.

F. Auzel (Oct. 1966) "Quantum counting by energy transfer from ytterbium(III) to thulium(III) in a mixed tungstate and in germanate glass," Comptes Rendus de l'Académie des Sciences Series B, 263B:819-821.

H. Goldenberg and CJ Tranter (1952; retrieved Apr. 2017) "Heat flow in an infinite medium heated by a sphere," British Journal of Applied Physics, 3(9):296-298.

RS Prasher et al. (Nov. 2005) "Nano and micro technology-based next-generation package-level cooling solutions," Intel Technology Journal, 9(4):285-296.

Z. Peng et al. (Aug. 2013) "Lipid bilayer and cytoskeletal interactions in a red blood cell," Proceedings of the National Academy of Sciences USA, 110(33):13356-13361.

TR Costa et al. (Jun. 2015) "Secretion systems in Gram-negative bacteria: structural and mechanistic insights," Nature Reviews Microbiology, 13(6):343-359.

Abramovici, Alex, et al. "LIGO: The laser interferometer gravitational-wave observatory." science 256.5055 (1992):325-333.

Ashkin, Arthur. "Optical trapping and manipulation of neutral particles using lasers." Proceedings of the National Academy of Sciences 94.10 (1997): 4853-4860.

Balachandran, B., and E. B. Magrab. "Vibrations 2nd edn (Toronto: Cengage Learning)." (2008).

Bensalah, A., et al. "Growth of Yb3+-doped YLiF4 laser crystal by the Czochralski method. Attempt of Yb3+ energy level assignment and estimation of the laser potentiality." Optical Materials 26.4 (2004): 375-383.

(56) References Cited

OTHER PUBLICATIONS

Bigotta, Stefano, et al. "Spectroscopic and laser cooling results on Yb 3+-doped Ba Y 2 F 8 single crystal." Journal of applied physics 100.1 (2006): 013109.
Bowman, S. R. "Radiation balanced lasers." Advanced Solid State Lasers. Optical Society of America, 1999.
Bowman, Steven R., Shawn P. O'Connor, and Subrat Biswal. "Ytterbium laser with reduced thermal loading." IEEE Journal of quantum electronics 41.12 (2005): 1510-1517.
Braginskii, Vladimir Borisovich, and Anatoli Borisovich Manukin. "Measurement of weak forces in physics experiments." Physics Today 31, 2, 51 (1978).
Brown, David C., and Hanna J. Hoffman. "Thermal, stress, and thermo-optic effects in high average power double-clad silica fiber lasers." IEEE Journal of quantum electronics 37.2 (2001): 207-217.
Chan, Jasper, et al. "Laser cooling of a nanomechanical oscillator into its quantum ground state." Nature 478.7367 (2011): 89-92.
Chen, Guanying, et al. "Core/shell NaGdF4: Nd3+/NaGdF4 nanocrystals with efficient near-infrared to near-infrared downconversion photoluminescence for bioimaging applications." ACS nano 6.4 (2012): 2969-2977.
Clark, J. L., and G. Rumbles. "Laser cooling in the condensed phase by frequency up-conversion." Physical review letters 76.12 (1996): 2037.
Clark, J. L., P. F. Miller, and G. Rumbles. "Red edge photophysics of ethanolic rhodamine 101 and the observation of laser cooling in the condensed phase." The Journal of Physical Chemistry A 102.24 (1998): 4428-4437.
Codemard, Christophe A., Jayanta K. Sahu, and Johan Nilsson. "Tandem cladding-pumping for control of excess gain in ytterbium-doped fiber amplifiers." IEEE journal of quantum electronics 46.12 (2010): 1860-1869.
Coluccelli, Nicola, et al. "Diode-pumped passively mode-locked Yb: YLF laser." Optics express 16.5 (2008): 2922-2927.
Fan, Tso Yee. "Laser beam combining for high-power, high-radiance sources." IEEE Journal of selected topics in Quantum Electronics 11.3 (2005): 567-577.
Fu, Shijie, et al. "Review of recent progress on single-frequency fiber lasers." JOSa B 34.3 (2017): A49-A62.
Garahan, Anna, et al. "Effective optical properties of absorbing nanoporous and nanocomposite thin films." Journal of applied physics 101.1 (2007): 014320.
Garcia-Meca, Carlos, et al. "On-chip wireless silicon photonics: from reconfigurable interconnects to lab-on-chip devices." Light: Science & Applications 6.9 (2017): e17053-e17053.
Gröblacher, Simon, et al. "Demonstration of an ultracold micro-optomechanical oscillator in a cryogenic cavity." Nature Physics 5.7 (2009): 485-488.
Gupta, Mool C., and John Ballato, eds. The handbook of photonics: Second Edition. CRC press, 2018.
Hansen, Kristian Rymann, et al. "Thermo-optical effects in high-power ytterbium-doped fiber amplifiers." Optics express 19.24 (2011): 23965-23980.
Hehlen, Markus P. "Crystal-field effects in fluoride crystals for optical refrigeration." Laser Refrigeration of Solids III. vol. 7614. International Society for Optics and Photonics, 2010.
Heller, René, Michael Hippke, and Pierre Kervella. "Optimized trajectories to the nearest stars using lightweight high velocity photon sails." The Astronomical Journal 154.3 (2017): 115.
Hosseini, Mahdi, et al. "Multimode laser cooling and ultra-high sensitivity force sensing with nanowires." Nature communications 5.1 (2014): 1-6.
Jensen, K., Kwanpyo Kim, and A. Zettl. "An atomic-resolution nanomechanical mass sensor." Nature nanotechnology 3.9 (2008): 533-537.
Ke, Wei-Wei, et al. "Thermally induced mode distortion and its limit to power scaling of fiber lasers." Optics express 21.12 (2013): 14272-14281.
Kirk, M. D., T. R. Albrecht, and C. F. Quate. "Low-temperature atomic force microscopy." Review of scientific Instruments 59.6 (1988): 833-835.
Knall, Jennifer M., Mina Esmaeelpour, and Michel JF Digonnet. "Model of anti-Stokes fluorescence cooling in a single-mode optical fiber." Journal of Lightwave Technology 36.20 (2018): 4752-4760.
Kolkowitz, Shimon, et al. "Coherent sensing of a mechanical resonator with a single-spin qubit." Science 335.6076 (2012): 1603-1606.
Kuznetsov, M. S., et al. "Electronic and thermal refractive index changes in Ytterbium-doped fiber amplifiers." Optics Express 21.19 (2013): 22374-22388.
Andau, L. "On the thermodynamics of photoluminescence." J. Phys.(Moscow), vol. 10, No. 6, (1946), pp. 503-506.
Lee, Jungchul, Fabian Goericke, and William P. King. "Temperature-dependent thermomechanical noise spectra of doped silicon microcantilevers." Sensors and Actuators A: Physical 145 (2008): 37-43.
Li, Yongzhuo, et al. "Room-temperature continuous-wave lasing from monolayer molybdenum ditelluride integrated with a silicon nanobeam cavity." Nature nanotechnology 12.10 (2017): 987-992.
Mahalingam, Venkataramanan, et al. "Structural and optical investigation of colloidal Ln 3+/Yb 3+ co-doped KY 3 F 10 nanocrystals." Journal of Materials Chemistry 19.20 (2009): 3149-3152.
Martin, John H., et al. "3D printing of high-strength aluminium alloys." Nature 549.7672 (2017).
Melgaard, Seth D., et al. "Optical refrigeration to 119 K, below National Institute of Standards and Technology cryogenic temperature." Optics Letters 38.9 (2013): 1588-1590.
Melgaard, Seth D., et al. "Solid-state optical refrigeration to sub-100 Kelvin regime." Scientific reports 6.1 (2016): 1-6.
Meyer, Gerhard. "A simple low-temperature ultrahigh-vacuum scanning tunneling microscope capable of atomic manipulation." Review of Scientific Instruments 67.8 (1996): 2960-2965.
Mobini, Esmaeil, et al. "Thermal modeling, heat mitigation, and radiative cooling for double-clad fiber amplifiers." JOSA B 35.10 (2018): 2484-2493.
Mohammed, Ziad, Hossein Saghafifar, and Mahmood Soltanolkotabi. "An approximate analytical model for temperature and power distribution in high-power Yb-doped double-clad fiber lasers." Laser Physics 24.11 (2014):115107.
Moore Jr, Glenn E., and Miles V. Klein. "Thermal conductivity of doped and pure cadmium sulfide." Physical Review 179.3 (1969): 722.
Nakayama, Y., Y. Harada, and T. Kita. "An energy transfer accompanied by phonon absorption in ytterbium-doped yttrium aluminum perovskite for optical refrigeration." Applied Physics Letters 117.4 (2020): 041104.
O'Connell, Aaron D., et al. "Quantum ground state and single-phonon control of a mechanical resonator." Nature 464.7289 (2010): 697-703.
Pant, Anupum, et al. "Anti-Stokes laser refrigeration of a nanoscale semiconductor gain medium." Photonic Heat Engines: Science and Applications. Vol. 10936. International Society for Optics and Photonics, 2019.
Pant, Anupum, et al. "Optomechanical thermometry of nanoribbon cantilevers." The Journal of Physical Chemistry C 122.13 (2018): 7525-7532.
Pant, Anupum, et al. "Solid-state laser refrigeration of a composite semiconductor Yb: YLiF 4 optomechanical resonator." Nature communications 11.1 (2020): 1-7.
Pant, Anupum, et al. "Solid-state laser refrigeration of a semiconductor optomechanical resonator." arXiv preprint arXiv:1910.02153 (2019).
Park, Young-Shin, and Hailin Wang. "Resolved-sideband and cryogenic cooling of an optomechanical resonator." Nature physics 5.7 (2009): 489-493.
Patterson, W. M., et al. "Measurement of solid-state optical refrigeration by two-band differential luminescence thermometry." JOSA B 27.3 (2010): 611-618.
Pauzauskie, Peter. Laser Refrigeration of Optically-Insulated Cryophotonic Nanocrystals. University of Washington Seattle United States, 2018.

(56) References Cited

OTHER PUBLICATIONS

Pirri, Angela, et al. "Direct Comparison of Yb 3+: CaF 2 and heavily doped Yb 3+: YLF as laser media at room temperature." Optics express 17.20 (2009): 18312-18319.
Johnson and Christy 1972, "Optical constants of Ag (Silver)," RefractiveIndex.INFO—Refractive index database, <https://refractiveindex.info> [retrieved Jul. 6, 2021], 3 pages.
Qiu, Liu, et al. "Laser cooling of a nanomechanical oscillator to its zero-point energy." Physical review letters 124.17 (2020): 173601.
Rahman, ATM Anishur, and P. F. Barker. "Laser refrigeration, alignment and rotation of levitated Yb 3+: YLF nanocrystals." Nature Photonics 11.10 (2017): 634-638.
Reddy, B. R., and P. Venkateswarlu. "Infrared to visible energy upconversion in Er3+-doped oxide glass." Applied physics letters 64.11 (1994): 1327-1329.
Richardson, Davis J., John Nilsson, and William A. Clarkson. "High power fiber lasers: current status and future perspectives." JOSA B 27.11 (2010): B63-B92.
Roder, Paden B., et al. "Cold Brownian motion in aqueous media via anti-Stokes photoluminescence." arXiv preprint arXiv:1503.07265 (2015).
Roder, Paden B., et al. "Laser refrigeration of hydrothermal nanocrystals in physiological media." Proceedings of the National Academy of Sciences 112.49 (2015): 15024-15029.
Roder, Paden B., et al. "Laser-refrigeration of rare-earth-doped nanocrystals in water." Laser Refrigeration of Solids VIII. vol. 9380. International Society for Optics and Photonics, 2015.
Roder, Paden B., Peter J. Pauzauskie, and E. James Davis. "Nanowire heating by optical electromagnetic irradiation." Langmuir 28.46 (2012): 16177-16185.
Schwab, Keith C., and Michael L. Roukes. "Putting mechanics into quantum mechanics." Physics Today 58.7 (2005):36-42.
Seletskiy, Denis V., et al. "Precise determination of minimum achievable temperature for solid-state optical refrigeration." Journal of luminescence 133 (2013).
Onnes, H.K., "Further experiments with Liquid Helium. D. On the change of Electrical Resistance of Pure Metals at very low Temperatures, etc. V. The Disappearance of the resistance of mercury." Koninklijke Nederlandse Akademie van Wetenschappen, Proceedings Royal Acad. Amsterdam 14 (1911): 113-115.
Kapitza PL (1941) The study of heat transfer in helium II. J Phys USSR 4(1-6):181- 210.
Anderson MH, Ensher JR, Matthews MR, Wieman CE, Cornell EA (1995) Observation of Bose-Einstein condensation in a dilute atomic vapor. Science 269(5221):198-201.
Feshchenko AV, Koski JV, Pekola JP (2014) Experimental realization of a Coulomb blockade refrigerator. Phys Rev B 90(20):201407.
Chowdhury I, et al (2009) On-chip cooling by superlattice-based thin-film thermoelectrics. Nat Nanotechnol 4(4):235- 238.
Flipse J, Bakker FL, Slachter A, Dejene FK, van Wees BJ (2012) Direct observation of the spin-dependent Peltier effect. Nat Nanotechnol 7(3):166-168.
Bogaerts W, Fiers M, Dumon P (2014) Design challenges in silicon photonics. IEEE J Sel Top Quantum Electron 20(4):1-8.
Vicario C et al. (2013) Pump pulse width and temperature effects in lithium niobate for efficient THz generation. Opt Lett 38(24):5373-5376.
Lucchetta EM, Lee JH, Fu LA, Patel NH, Ismagilov RF (2005) Dynamics of *Drosophila* embryonic patterning network perturbed in space and time using icrofluidics. Nature 434(7037):1134-1138.
Lee JH et al. (2013) Regulation of temperature-esponsive flowering by MADS-box transcription factor repressors. Science 342(6158):628-632.
Kucsko G et al. (2013) Nanometre-scale thermometry in a living cell. Nature 500(7460):54-58.
Epstein RI, Buchwald MI, Edwards BC, Gosnell TR, Mungan CE (1995) Observation of laser-induced fluorescent cooling of a solid. Nature 377(6549):500-503.

Mungan CE, Gosnell TR (1996) Comment on "Laser cooling in the condensed phase by frequency upconversion" Phys Rev Lett 77(13):2840.
Rumbles, G., and J. L. Clark. "Rumbles and Clark reply." Physical review letters 77.13 (1996): 2841.
Filho ESdL, Nemova G, Loranger S, Kashyap R (2013) Laser-induced cooling of a Yb:YAG crystal in air at atmospheric pressure. Opt Exp 21(21):24711-24720.
Zhang J, Li D, Chen R, Xiong Q (2013) Laser cooling of a semiconductor by 40 kelvin. Nature 493(7433):504-508.
Arita Y, Mazilu M, Dholakia K (2013) Laser-induced rotation and cooling of a trapped microgyroscope in vacuum. Nat Commun 4(2374).
Palik ED (1998) Handbook of optical constants of solids. (Academic Press) vol. 3.
Chakraborty D et al. (2011) Generalised Einstein relation for hot Brownian motion. Eur Phys Lett 96(6):60009.
Kroy K (2014) Levitating nanoparticles: Non-equilibrium nano-thermometry. Nat Nanotechnol 9(6):415-417.
Hehlen MP, Epstein RI, Inoue H (2007) Model of laser cooling in the Yb3+-doped fluorozirconate glass ZBLAN. Phys Rev B 75(14):144302.
Seletskiy DV, Hehlen MP, Epstein RI, Sheik-Bahae M (2012) Cryogenic optical refrigeration. Adv Opt Photonics 4(1):78-107.
Ashkin A, Schutze K, Dziedzic J, Euteneuer U, Schliwa M (1990) Force generation of organelle transport measured in vivo by an infrared laser trap. Nature. 348:346-348.
Seletskiy DV et al. (2010) Laser cooling of solids to cryogenic temperatures. Nature Photon 4(3):161-164.
Lu C, Huang W, Ni Y, Xu Z (2011) Hydrothermal synthesis and luminescence properties of octahedral LiYb(4):Er(3+) microcrystals. Mat Res Bull 46(2):216-221.
Li D et al. (2012) Direction-specific interactions control crystal growth by oriented attachment. Science 336(6084):1014-1018.
Roder PB, Smith BE, Davis EJ, Pauzauskie PJ (2014) Photothermal heating of nanowires. J Phys Chem C 118(3):1407-1416.
Haro-González P et al. (2013) Optical trapping of NaYF4:Er3+, Yb3+ upconverting fluorescent nanoparticles. Nanoscale 5(24):12192-12199.
Auzel F (2004) Upconversion and anti-Stokes processes with f and d ions in solids. Chem Rev 104(1):139-174.
McLaurin EJ, Bradshaw LR, Gamelin DR (2013) Dual-emitting nanoscale temperature sensors. Chem Mater 25(8):1283-1292.
Wang F, Banerjee D, Liu Y, Chen X, Liu X (2010) Upconversion nanoparticles in biological labeling, imaging, and therapy. Analyst 135(8):1839-1854.
Mor FM, Sienkiewicz A, Forr'o L, Jeney S (2014) Upconversion particle as a local luminescent Brownian probe: A photonic force microscopy study. ACS Photonics 1(12):1251-1257.
Vetrone F et al. (2010) Temperature sensing using fluorescent nanothermometers. ACS Nano 4(6):3254-3258.
Dong GZ, Zhang XL, Li L (2013) Energy transfer enhanced laser cooling in Ho 3+ and Tm 3+-codoped lithium yttrium fluoride. J Opt Soc Am B 30(4):939-944.
Huang H, Delikanli S, Zeng H, Ferkey DM, Pralle A (2010) Remote control of ion channels and neurons through magnetic-field heating of nanoparticles. Nat Nanotechnol 5(8):602-606.
Hodak JH, Fiore JL, Nesbitt DJ, Downey CD, Pardi A (2005) Docking kinetics and equilibrium of a GAAA tetraloop-receptor motif probed by single-molecule FRET. Proc Natl Acad Sci USA 102(30):10505-10510.
Iwaki M, Iwane AH, Ikezaki K, Yanagida T (2015) Local Heat Activation of Single Myosins Based on Optical Trapping of Gold Nanoparticles. Nano Lett 15(4):2456-2461.
Cahill DG et al. (2003) Nanoscale thermal transport. J App Phys 93(2):793-818.
Rings D, Schachoff R, Selmke M, Cichos F, Kroy K (2010) Hot brownian motion. Phys Rev Lett 105(9):090604.
Grier DG (2003) A revolution in optical manipulation. Nature 424(6950):810-816.
Neuman KC, Block SM (2004) Optical trapping. Rev Sci Instrum 75(9):2787-2809.

(56) References Cited

OTHER PUBLICATIONS

Tolić-Nørrelykke SF et al. (2006) Calibration of optical tweezers with positional detection in the back focal plane. Rev Sci Instrum 77(10):103101.

Peterman EJ, Gittes F, Schmidt CF (2003) Laser-induced heating in optical traps. Biophys J 84(2):1308-1316.

Berg-Sørensen K, Flyvbjerg H (2004) Power spectrum analysis for optical tweezers. Rev. Sci. Instrum. 75(3):594-612.

Rings D, Selmke M, Cichos F, Kroy K (2011) Theory of hot Brownian motion. Soft Matter 7(7):3441.

Hinderliter PM, et al. (2010) ISDD: A computational model of particle sedimentation, diffusion and target cell dosimetry for in vitro toxicity studies. Part. Fibre Toxicol. 7(1):36.

DV Seletskiy et al. (Sep. 2011) Local laser cooling of Yb:YLF to 110 K, Optics Express, 19(19):18229-18236.

EF Nichols and GF Hull (Nov. 1901) "A Preliminary Communication on the Pressure of Heat and Light Radiation," Physical Review (Series I), 13:307-320.

P. Lebedew (Jan.-Jun. 1902) "An Experimental Investigation of the Pressure of Light," The Astrophysical Journal, 15:60-62.

S. Arrhenius (Nov. 1900) "The Cause of the Northern Lights," Physikalische Zeitschrift, (6):81-87.

Snitzer, E., et al. "Double clad, offset core Nd fiber laser," Conference Paper. Jan. 1988, <https://www.researchgate.net/publication/263840867>, [Retrieved Apr. 10, 2017], 5 pages.

Sugiyama, Akira, et al. "Spectroscopic properties of Yb doped YLF grown by a vertical Bridgman method." Journal of alloys and compounds 408 (2006): 780-783.

Teufel, John D., et al. "Sideband cooling of micromechanical motion to the quantum ground state." Nature 475.7356 (2011): 359-363.

Treharne, R. E., et al. "Optical design and fabrication of fully sputtered CdTe/CdS solar cells." Journal of Physics: Conference Series. vol. 286. No. 1. IOP Publishing, 2011.

Urton, James, "Laser allows solid-state refrigeration of a semiconductor material," UW News, Jun. 23, 2020, <https://www.washington.edu/news/2020/06/23/laser-refrigeration-semiconductor/> [Retrieved May 26, 2021], 5 pages.

Wang, Xiangru, et al. "Transverse mode competition in gain-guided index antiguided fiber lasers." JOSA B 29.2 (2012); 191-196.

Xia, Xiaojing, et al. "Design of a radiation-balanced fiber laser via optically active composite cladding materials." JOSA B 36.12 (2019): 3307-3314.

Xia, X., et al. "Hydrothermal Synthesis and Solid-State Laser Refrigeration of Ytterbium-Doped Potassium Lutetium Fluoride (KLF) Microcrystals." (2020).

Xia, Xiaojing, et al. "Laser refrigeration of optical fibers via optically-active composite cladding materials." Photonic Heat Engines: Science and Applications. vol. 10936. International Society for Optics and Photonics, 2019.

Xue, Dong. "Three-dimensional simulation of the temperature field in high-power double-clad fiber laser." Optik 122.10 (2011): 932-935.

Yeh, D. C., et al. "Intensity-dependent upconversion efficiencies of Er3+ ions in heavy-metal fluoride glass." Journal of applied physics 69.3 (1991): 1648-1653.

Yoneda, Hitoki, Kazuhiko Yamaguchi, and Ken-ichi Ueda. "Dispersion of optical refractive index of Yb3+-doped laser glass and their fitting to Lorentzian model." Jpn. J. Appl. Phys., vol. 38 (1999), pp. L 639-L 641.

Zander, Christoph, and Karl Heinz Drexhage. "Cooling of a dye solution by anti-Stokes fluorescence." Advances in photochemistry 20 (1995): 59-78.

Zhang, Shubin, et al. "Progress in laser cooling semiconductor nanocrystals and nanostructures." NPG Asia Materials 11 (2019): 1-19.

Zhong, Biao, et al. "Laser cooling of the Yb3+-doped LuLiF4 single crystal for optical refrigeration." Journal of Luminescence 226 (2020): 117472.

Zhou, Pu, et al. "High-power fiber lasers based on tandem pumping." JOSA B 34.3 (2017): A29-A36.

Zhou, Xuezhe, et al. "Laser refrigeration of ytterbium-doped sodium-yttrium-fluoride nanowires." Advanced Materials 28 (2016): 8658-8662.

Zhu, Xiushan, and N. Peyghambarian. "High-power ZBLAN glass fiber lasers: review and prospect." Advances in OptoElectronics 2010 (2010).

Einstein, Albert. "Zur elektrodynamik bewegter körper." Annalen der physik 4 (1905), pp. 891-921.

Pringsheim, P. "Zwei Bemerkungen über den Unterschied von Lumineszenz- und Temperaturstrahlung." Z. Physik 57, 739-746 (1929). https://doi.org/10.1007/BF01340652.

Liberty et al., "Randomized algorithms for the low-rank approximation of matrices", Proceedings of the National Academy of Sciences of the United States of America (2007), 20 pages. www.pnas.org/cgi/doi/10.1073/pnas.0709640104.

Snyder, "Optical Waveguide Theory," Springer, <https://www.springer.com/gp/book/9780412099502>, accessible on Jun. 25, 2021, Part I: Ray Analysis of Multimode Optical Waveguides, 9 pages.

Allen, Theresa M., Mark F. Buehler, and E. James Davis. "Radiometric effects on absorbing microspheres." Journal of colloid and interface science 142.2 (1991): 343-356.

Pini, Valerio, et al. "Shedding light on axial stress effect on resonance frequencies of nanocantilevers." ACS nano 5.6 (2011): 4269-4275.

\* cited by examiner

SOLID-STATE LASER REFRIGERATION OF COMPOSITE OPTOMECHANICAL RESONATORS

CROSS-REFERENCE TO RELATED APPLICATION

This application claims the benefit of U.S. Patent Application No. 62/962,794, filed Jan. 17, 2020, the disclosure of which is hereby incorporated by reference in its entirety.

STATEMENT OF GOVERNMENT LICENSE RIGHTS

This invention was made with government support under Grant No. FA9550-16-1-0362, awarded by the Air Force Office of Scientific Research. The government has certain rights in the invention.

BACKGROUND

Photothermal heating represents a major constraint that limits the performance of many nanoscale optoelectronic and optomechanical devices including nanolasers, quantum optomechanical resonators, and integrated photonic circuits. Although radiation-pressure damping has been reported to cool an individual vibrational mode of an optomechanical resonator to its quantum ground state, to date the internal material temperature within an optomechanical resonator has not been reported to cool via laser excitation.

Additionally, optically refrigerating the lattice of a dielectric resonator has the potential to impact several fields including scanning probe microscopy, the sensing of weak forces, the measurement of atomic masses, and the development of radiation-balanced solid-state lasers. In addition, optically refrigerated resonators may be used in the future as a promising starting point to perform motional cooling for exploration of quantum effects at mesoscopic length scales, temperature control within integrated photonic devices, and solid-state laser refrigeration of quantum materials.

Further, photothermal heating is a perennial challenge in the development of advanced optical devices at nanometer length scales given that a material's optical index of refraction, bandgap, and Young's modulus all vary with temperature. For instance, reducing the mechanical motion of an optomechanical resonator to its quantum ground state requires that the temperature (T) must be much less than hv/kb, where v is the mode frequency, h and kb are Planck and Boltzmann constants, respectively. Critically, incident laser irradiances must be kept low enough to avoid photothermal heating of the resonator above cryogenic temperatures.

Among other applications in scanning probe microscopy and exploration of quantum effects at mesoscopic length scales, optical refrigeration of a mechanical resonator could have significant implications for weak force and precision mass sensing applications, in the development of composite materials for radiation balanced lasers, and local temperature control in integrated photonic devices. In the future, solid state laser refrigeration may also assist in the cooling of optomechanical devices by enabling the use of higher laser irradiances in the absence of detrimental laser heating.

Because of this, optomechanical resonators configured to cool, and methods for cooling optomechanical resonators are needed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, an optomechanical resonator is provided that is configured to indirectly cool via laser irradiance, the optomechanical resonator comprising:
a cantilever;
a cooling end of the cantilever, having a cooling end comprising a laser-induced cooling element; and
an attachment end of the cantilever, attached to a substrate.

In another aspect a method of indirectly cooling an optomechanical resonator is provided. In one embodiment the method includes impinging a laser on an optomechanical resonator attached to a substrate, wherein the optomechanical resonator comprises:
a cantilever;
a cooling end of the cantilever, having a cooling end comprising a laser-induced cooling element; and
an attachment end of the cantilever, attached to a substrate; and
wherein the laser has a peak wavelength in the near-infrared band.

In some embodiments, an optomechanical resonator is described. In some embodiments, the semiconductor optomechanical resonator is suspended in vacuum from a silicon wafer to reduce the potential for photothermal heating of the adjacent silicon substrate. In some embodiments, Van der Waals bonding is used to attach a low-cost, hydrothermal ceramic Yb:YLF microcrystal to the end of the resonator cavity.

In some embodiments, rare-earth ($Yb^{3+}$) point-defects within the YLF emit anti-Stokes photoluminescence which cools both the YLF microcrystal, and the underlying semiconductor optomechanical resonator. The YLF may serve both as a local thermometer and also as a heat sink which extracts thermal energy from the cantilever, increasing its Young's modulus, and thereby blue-shifting the cantilever's optomechanical eigenfrequency. In some embodiments, the transmitted laser causes minimal heating of the cantilever supporting the YLF crystal due to its small thickness (~150 nm) and extremely low absorption coefficient of CdS at 1020 nm.

In some embodiments, the direct laser refrigeration of a semiconductor optomechanical resonator is >20K below room temperature based on the emission of upconverted, anti-Stokes photoluminescence of trivalent ytterbium ions doped within a yttrium-lithium-fluoride (YLF) host crystal. In some embodiments, a photothermal cooling of nanoscale optoelectronic devices through the emission of blue-shifted (anti-Stokes) photoluminescence is disclosed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings wherein.

DETAILED DESCRIPTION

The present technology demonstrates an approach to refrigerate the temperature of an optomechanical resonator >20K below room temperature using solid state laser refrigeration.

In one aspect, an optomechanical resonator is provided that is configured to indirectly cool via laser irradiance, the optomechanical resonator comprising:
   a cantilever;
   a cooling end of the cantilever, having a cooling end comprising a laser-induced cooling element; and
   an attachment end of the cantilever, attached to a substrate.

In another aspect a method of indirectly cooling an optomechanical resonator is provided. In one embodiment the method includes impinging a laser on an optomechanical resonator attached to a substrate,
   wherein the optomechanical resonator comprises:
   a cantilever;
   a cooling end of the cantilever, having a cooling end comprising a laser-induced cooling element; and
   an attachment end of the cantilever, attached to a substrate; and
   wherein the laser has a peak wavelength in the near-infrared band.

Figure 1A:
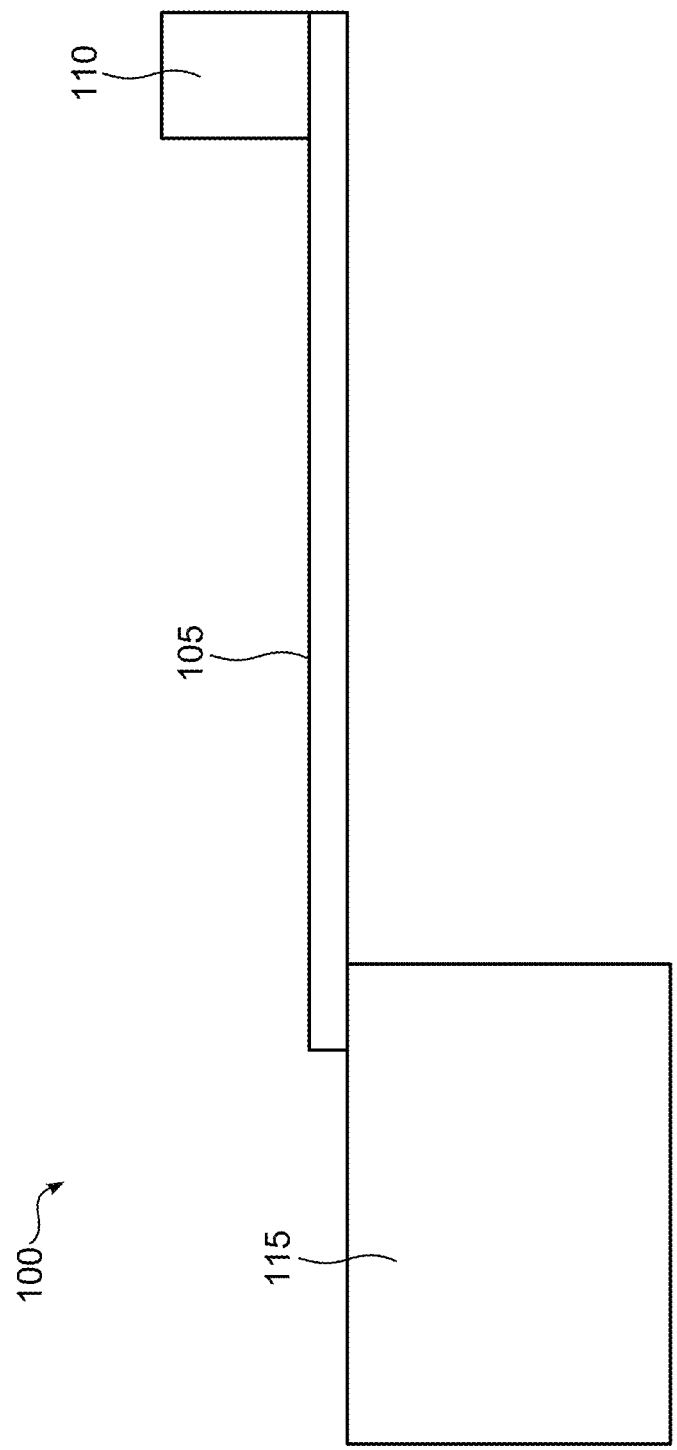
FIG. 1A is a schematic of an example optomechanical resonator in accordance with the present technology.

FIG. 1A is a schematic of an example optomechanical resonator 100 in accordance with the present technology. The optomechanical resonator 100 may be a portion of a device including, but not limited to, a scanning probe microscope, a photonic waveguide device, a photonic detector device, a nonlinear photonic device, an electronic device, a force sensor, or a mass sensor. The optomechanical resonator 100 includes a cantilever 105, a cooling end 110, and an attachment end 115. In some embodiments, the optomechanical resonator 100 may be configured to indirectly cool, as described below. In some embodiments, the optomechanical resonator 100 indirectly cools using laser irradiance.

The optomechanical resonator 100 includes a cantilever 105. In some embodiments, the cantilever 105 is formed from a material having a low absorption coefficient at a peak wavelength. In some embodiments, the peak wavelength is the peak wavelength of a laser, such as cooling element 110, described in further detail below. In some embodiments, the peak wavelength is in the range of 1020 nm to 1064 nm. In some embodiments, the cantilever 105 is formed from CdS, $Si_3N_4$, and/or $SiO_2$. In some embodiments, the cantilever 105 has a flat, smooth surface. The cantilever 105 is illustrated as rectangular in FIG. 1A, but in other embodiments, the cantilever 105 may take any number of shapes.

In some embodiments, the optomechanical resonator 100 includes a cooling end 110. The cooling end 110 may be attached to the cantilever 105 by Van der Waals bonding. In some embodiments, the cooling end 110 is a laser-induced cooling element. Examples of such a laser-induced cooling element include, but are not limited to, Yb:YLiF4, Yb:NaYF4, Yb:LuLiF4, Yb:KLuF4, and Yb:KYF4 crystals. In some embodiments, the laser-induced cooling element has a flat surface. In some embodiments, the cooling end 110 is cuboid, but in other embodiments, the cooling end 110 may take any number of shapes.

In some embodiments, the optomechanical resonator 100 includes an attachment end 115. In some embodiments, the attachment end 115 is attached to a substrate (not pictured in FIG. 1A). In some embodiments, the substrate is a silicon substrate. In some embodiments, the attachment end 115 is formed from the substrate.

In operation, the cooling end 110 impinges the optomechanical resonator 100 with laser irradiance. In some embodiments, the cooling results from the emission of upconverted, anti-Stokes photoluminescence in the laser-induced cooling element. In some embodiments, the laser has a peak wavelength in the near-infrared band. In some embodiments, the laser irradiance has a peak wavelength in the range of 1020 nm to 1064 nm. In some embodiments, the cooling end 200 cools the optomechanical resonator 1000 to a temperature greater than 20K.

In certain embodiments the cooling end 110 has a thickness in the range of 200 nm to 10 micrometers. In a further embodiment, the cooling end has a thickness in the range of 2 micrometers to 6 micrometers.

In certain embodiments, the cantilever has nanoscale dimensions that enable thermomechanical motion. This is a unique nanoscale effect that enables the cantilever to be "driven" by heat (rather than an external piezo stage) as a consequence of the fluctuation-dissipation theorem of statistical thermodynamics. It is analogous to Brownian motion, but for a small solid object that does not have to be in a fluid. With thermomechanical motion, an additional piezo stage is not needed to drive or sense the cantilever's eigenfrequency.

In relation to the nanoscale effects described herein, in certain embodiments the cantilever 105 has a thickness that is 200 nm or less. In a further embodiment, the cantilever has a thickness of 150 nm or less. In yet a further embodiment, the cantilever has a thickness of 80 nm to 150 nm. In yet a further embodiment, the cantilever has a thickness of 80 nm to 200 nm.

If the cantilever 105 is thicker than 200 nm it may not have the thermomechanical motion, but certain embodiments described herein do not require thermomechanical motion, such as an AFM cantilever driven by a piezo instead of thermomechanical motion. In such embodiments, the cantilever 105 has a thickness of between 200 nm and 5 micrometers. In a further embodiment, the cantilever has a thickness between 1 micrometer and 3 micrometers.

Figure 1B:
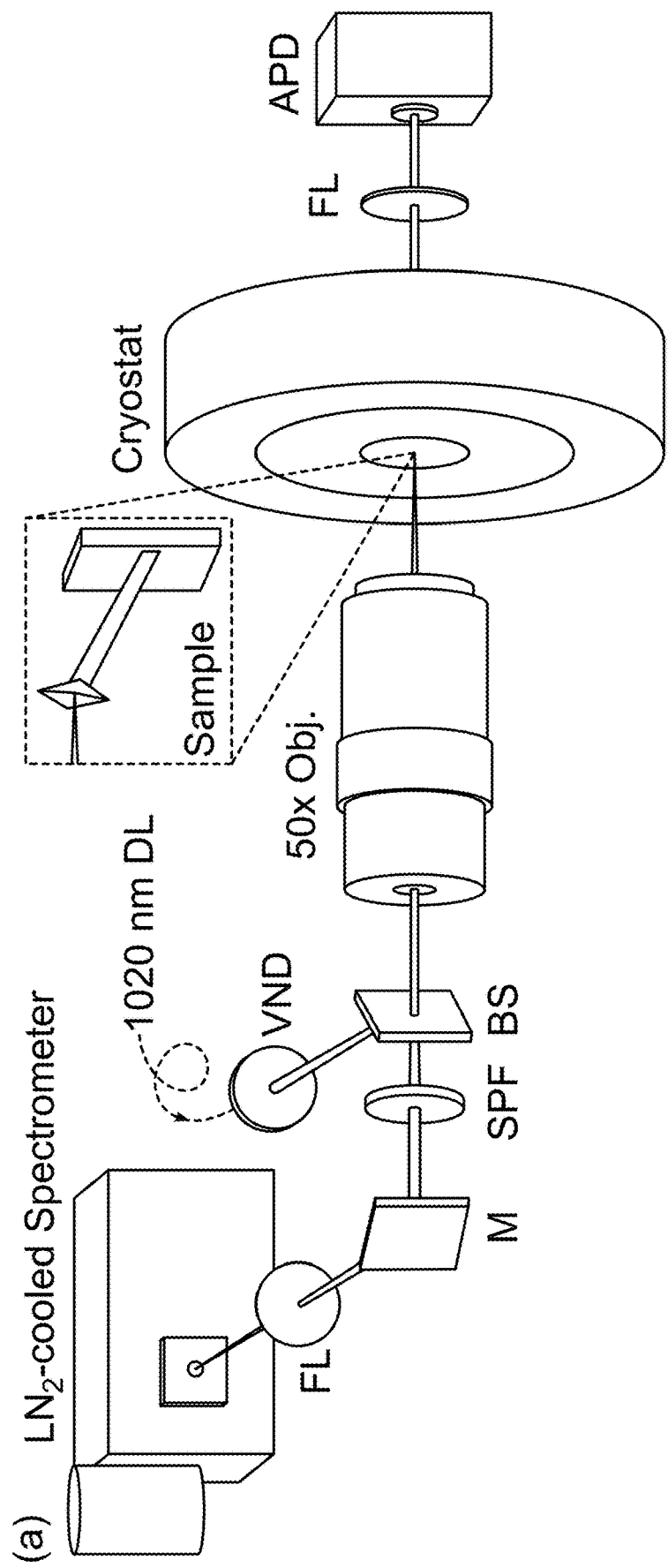
FIG. 1B is a schematic of an eigenfrequency and upconverted fluorescence measurement setup in accordance with the present technology.

FIG. 1B is a schematic of an eigenfrequency and upconverted fluorescence measurement setup in accordance with the present technology. The example measurement setup includes focusing lenses (FL), a mirror (M), a short pass filter (SPF), a diode laser (DL), a beam splitter (BS), a variable neutral density filer (VND) and an avalanche photodiode (APD). In some embodiments, the short pass filter (SPF) is a 1000 nm SPF. An optomechanical resonator (such as optomechanical resonator 100) is illustrated (Sample). The optomechanical resonator may include a cantilever (such as cantilever 105) a cooling element (such as cooling end 110), and an attachment end (such as attachment end 115). In some embodiments, the cooling element is a Yb:YLF crystal.

In one embodiment, a micron-scale grain of 10% $Yb^{3+}$-doped $YLiF_4$ (Yb:YLF) located at the end of a semiconductor optomechanical resonator (CdS) to cool the resonator >20K below room temperature was used, following excitation with a cw-laser source with wavelength $\lambda_0=1020$ nm.

In operation, the measurement setup in FIG. 1B measures the voltage vs. time signal of the cantilever. The eigenfrequencies of the cantilever may then be calculated by Fourier transforming the voltage vs. time signal to obtain its thermomechanical noise spectrum. In operation, a laser may be focused onto the cooling element at the end of the cantilever. In some embodiments, the laser is a 1020 nm laser. In some embodiments, the 1020 nm laser is forward scattered. In some embodiments, the time-dependent intensity of the forward-scattered 1020 nm laser is measured by focusing it onto the APD.

In one embodiment, the backscattered photoluminescence was collected from the rear end of the objective, transmitted through a beam splitter, and filtered using a 1000 nm short-pass filter and focused into the spectrometer slit. The photoluminescence (PL) spectrum was recorded at different grating positions, with appropriate collection times to avoid saturating the detector, and were stitched together. Ten spectra were collected using 39 $kW/cm^2$ of laser irradiance for 0.1 s and averaged (as shown in FIG. 1D). A longer acquisition time (50×) was used to collect the weaker luminescence signal from the other rare earth (RE) impurities that were not explicitly added during synthesis.

Figure 1C:
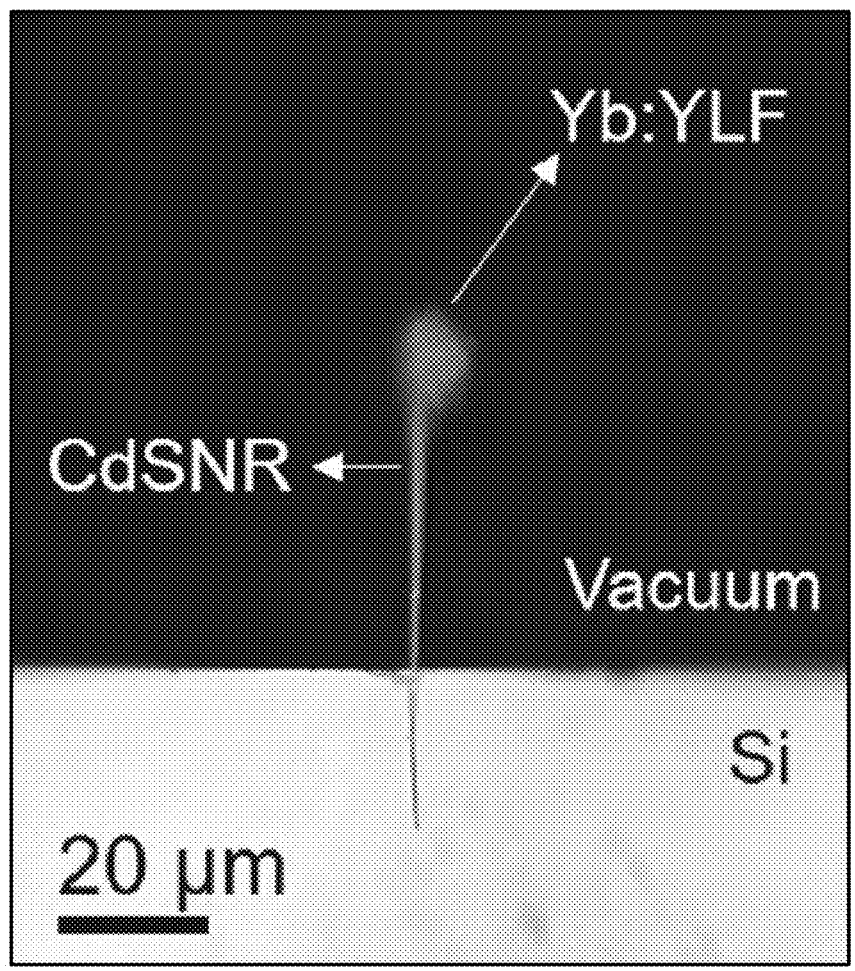
FIG. 1C is a bright field optical image of an example optomechanical resonator in accordance with the present technology.
Figure 1D:
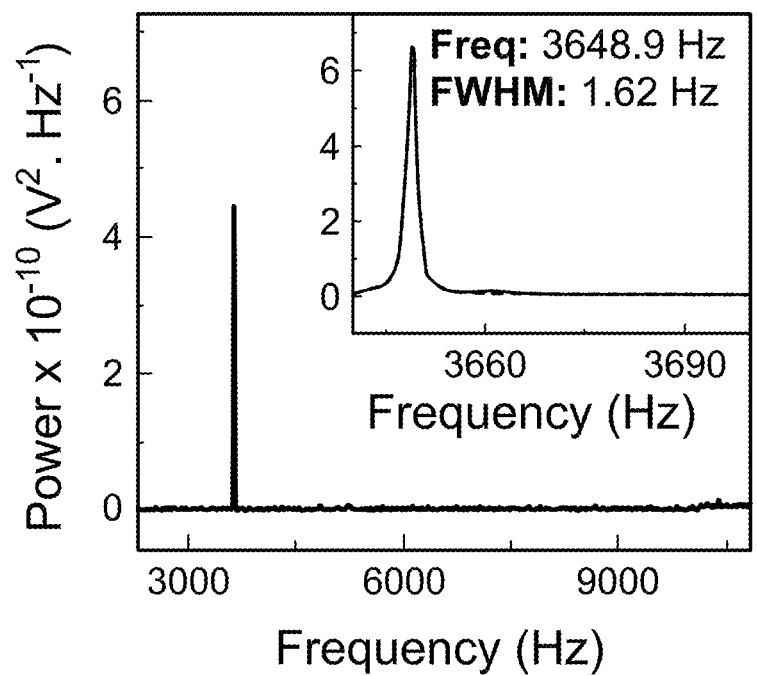
FIG. 1D is a graph of a peak in the thermomechanical noise spectrum originating from the fundamental eigenfrequency of an example optomechanical resonator in accordance with the present technology.

FIG. 1C is a bright field optical image of an example optomechanical resonator in accordance with the present technology. The illustrated optomechanical resonator includes a CdSNR cantilever supported using a silicon substrate with a cooling end in the form of a $Yb^{3+}$:YLF crystal placed at the free end of the cantilever. In other embodiments, the cantilever, substrate, and cooling end may be comprised of other materials. In one embodiment, a CdSNR cantilever was placed at the end of a clean silicon substrate, and a hydrothermally grown 10% Yb:YLF crystal was placed at the free end of the CdSNR cantilever. The cantilever may be formed of CdS because of its wide band gap and low-cost, though any material with low near-infrared (NIR) absorption can be used. In one embodiment, the silicon substrate was loaded inside a cryostat chamber such that the free end of the cantilever was suspended over the axial hole in the cryostat, and the system was pumped to $\sim 10^{-4}$ torr.

FIG. 1D is a graph of a peak in the thermomechanical noise spectrum originating from the fundamental eigenfrequency of an example optomechanical resonator in accordance with the present technology. On the horizontal axis is the Frequency. On the vertical axis is the Power. A representative power spectrum measured on the sample at 300 K using a laser irradiance of 39 $kW/cm^2$ is shown, generated from the optomechanical resonator described in FIG. 1C.

Illustrated is a peak in the thermomechanical noise spectrum originating from the fundamental eigenfrequency of the CdSNR with $Yb^{3+}$:YLF sample obtained at the 0.038 $MW/cm^2$ at 300 K. The sharp peak, fitted using a standard Lorentzian with a peak position at 3648.9 Hz, was attributed to the first natural resonant frequency mode ("diving board mode") of the fluoride crystal on the nanoribbon (FCNR) cantilever system.

Figure 1E:
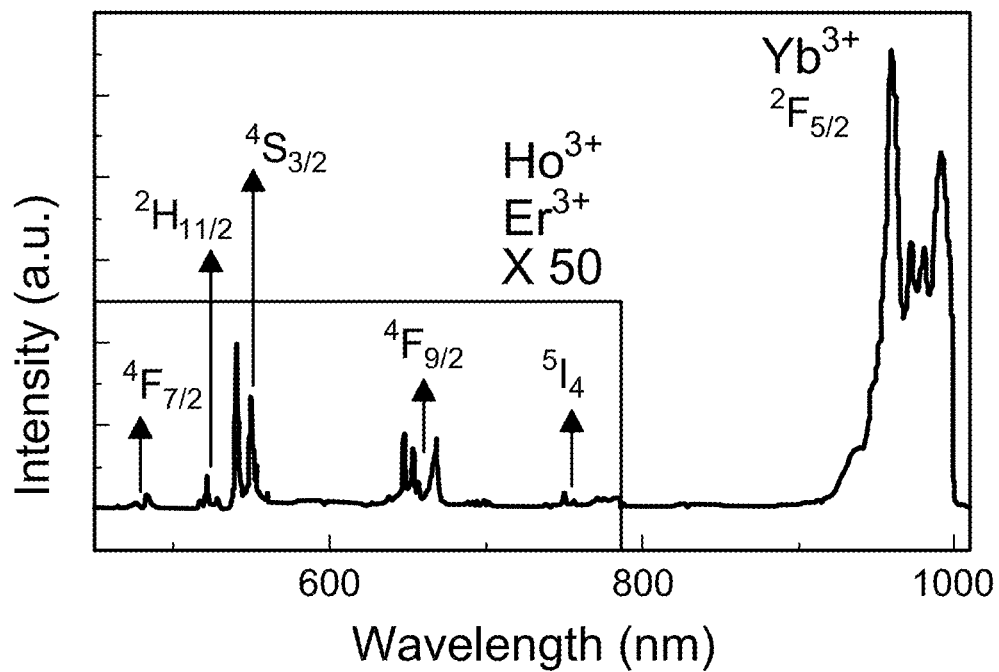
FIG. 1E is a graph of an example stitched, up-converted fluorescence spectrum obtained at room temperature in accordance with the present technology.

FIG. 1E is a graph of an example stitched, up-converted fluorescence spectrum obtained at room temperature in accordance with the present technology. On the horizontal axis is the Wavelength. On the vertical axis is the Intensity. The example stitched, up-converted fluorescence spectrum was obtained at room temperature using a 1020 nm excitation source (0.039 $MW/cm^2$) focused on the suspended $Yb^{3+}$:YLF crystal. A 1000 nm short pass filter was used to cut off the laser line.

The emission of upconverted, anti-Stokes photoluminescence of trivalent ytterbium ions doped within an yttrium-lithium-fluoride (YLF) host crystal is illustrated. The intense $Yb^{3+}$ transitions in the range of 800 to 1000 nm, with major peaks at 960 ($E_6$–$E_1$), 972 ($E_5$–$E_1$) and 993 ($E_5$–$E_3$) nm were observed. The up-converted green and red emission peaks at 520, 550 and 650 nm are attributed to the transitions from $^2H_{11/2}$, $^4S_{3/2}$ and $^4F_{9/2}$, respectively, of trivalent erbium ions ($Er^{3+}$). Other minor transitions are labeled.

Figure 2A:
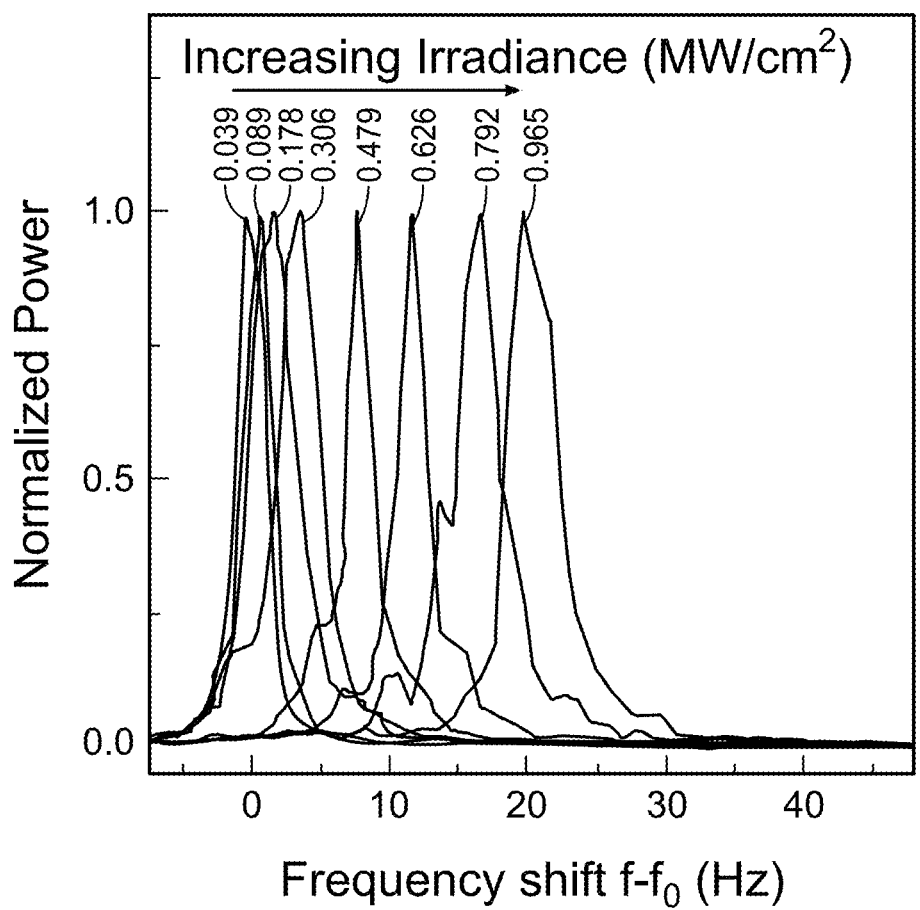
FIG. 2A is a graph of normalized power spectra for a representative laser refrigeration measurement at an example laser irradiance in accordance with the present technology.

FIG. 2A is a graph of normalized power spectra for a representative laser refrigeration measurement at an example laser irradiance in accordance with the present technology. On the horizontal axis is the Frequency Shift. On the vertical axis is the Normalized Power. The arrow along the top of the graph shows increasing irradiance.

The example graph shows normalized power spectra for a representative laser refrigeration measurement at each laser irradiance with an ambient reference temperature of 295 K ($f_0$=3632.2 Hz). Power spectra normalized using the maximum value at different laser irradiances obtained from the sample of one embodiment of the present technology are plotted. When fit to a standard Lorentzian, the peak values show a blue-shift in the eigenfrequency of the FCNR system as the laser power is increased.

Figure 2B:
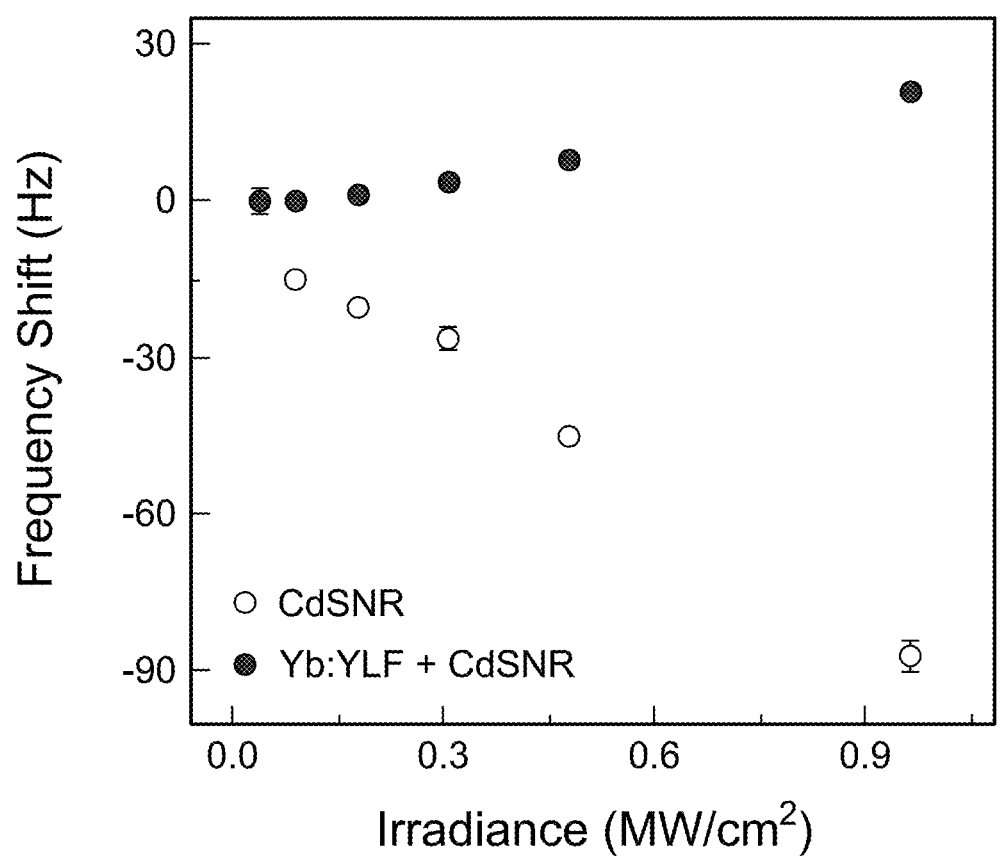
FIG. 2B is a graph of the frequency shift with laser power of an example optomechanical resonator in accordance with the present technology.

FIG. 2B is a graph of the frequency shift with laser power of an example optomechanical resonator in accordance with the present technology. On the horizontal axis is Irradiance. On the vertical axis is the Frequency Shift ($f$–$f_0$) with laser power at 295K. One data series represents a plain CdSNR cantilever (without a cooling end). The other data series represents a CdSNR cantilever with a cooling end in the form of a Yb:YLF crystal. The fitted peak values of the power spectra in FIG. 2A are shown in FIG. 2B. Each data point was averaged from Lorentzian fits of 6 power spectra and error bars represent one standard deviation. Note that for small standard deviations, the error bars overlap with the data point; $f_0$ is 3632.2 Hz and 17384.4 Hz, respectively.

As the laser irradiance increases, the Yb:YLF source reaches lower temperatures, thereby extracting more heat from the CdSNR cantilever and causing a blue-shift in the frequency due to an increased Young's modulus of the CdS at lower temperatures.

In one embodiment, using 0.5 $MW/cm^2$ of 980 nm laser resulted in the irreversible photothermal melting of the cantilever device. When the Yb:YLF crystal was removed from the CdSNR cantilever, the fundamental frequency measured at 39 kW/cm² increased to a higher value of 17384.3 Hz due to the removal of mass from the system (~1.3×10⁻⁹ g).

In one embodiment, as a control experiment, the eigenfrequency of the CdSNR cantilever itself was measured after the removal of the Yb:YLF crystal. The eigenfrequency of the cantilever without the crystal was then measured as a function of the laser power and is shown in FIG. 2B. The eigenfrequency red-shifts as the laser irradiance is increased, suggesting greater heating of the cantilever at higher irradiances due to the decreasing Young's modulus at higher temperatures.

In one embodiment, the temperature of the FCNR device was calibrated by increasing the temperature of the cryostat from 160 to 300 K, which showed a linear red-shift in the eigenfrequency of the cantilever. The slope of −0.389 Hz/K obtained using this calibration was used to measure the temperature change of the cantilever system during laser refrigeration experiments. The maximum blue-shift in the eigenfrequency as a function of laser irradiance of the was +20.6 Hz at an irradiance of 965 kW/cm², compared to the lowest irradiance of 39 kW/cm². Based on the isothermal temperature calibration, ignoring temperature gradients and other optomechanical effects on the cantilever due to increased irradiance, this blue-shift of +20.6 Hz corresponds to a temperature change of 53 K below room temperature (assuming a negligible change in temperature at a laser irradiance of 39 kW/cm²).

Figure 2C:
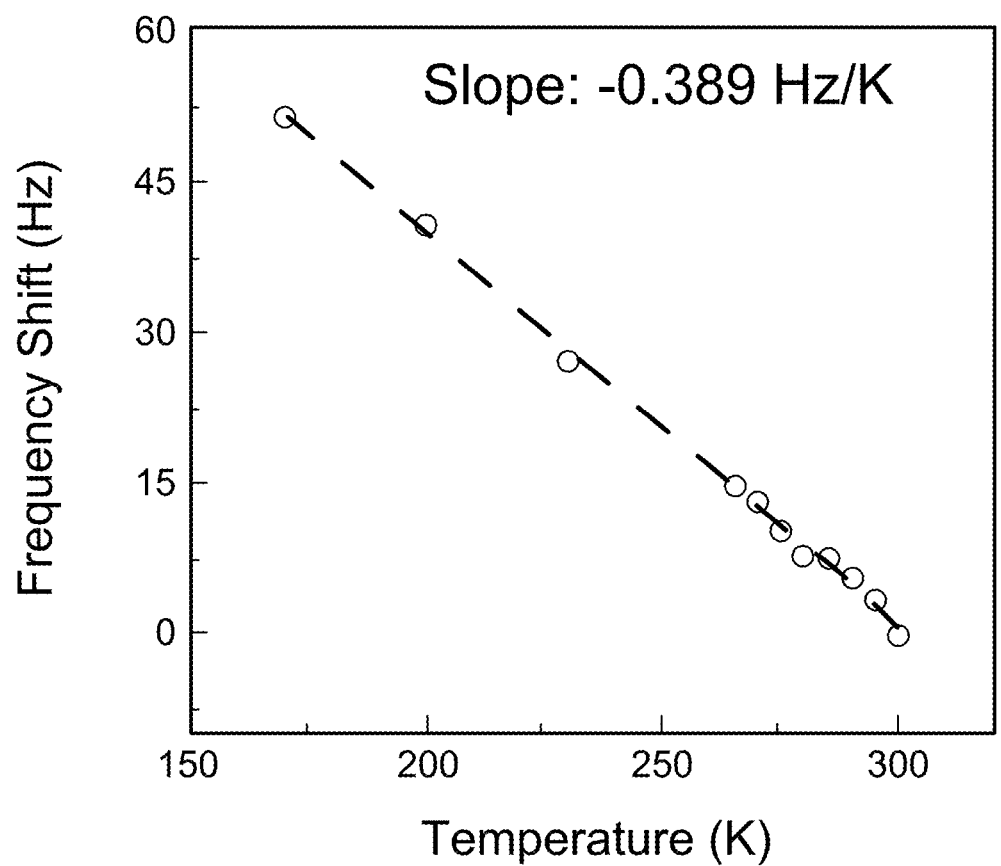
FIG. 2C is a graph of temperature calibration of an example optomechanical resonator in accordance with the present technology.

FIG. 2C is a graph of temperature calibration of an example optomechanical resonator in accordance with the present technology. On the horizontal axis is Temperature in K. On the vertical axis is the Frequency Shift (f–f₀). The example temperature calibration graph was generated by measuring the frequency shift (f₀=3653.6 Hz) as a function of the cryostat temperature.

However, to obtain the absolute change in temperature it is important to view the system through a modified Euler-Bernoulli beam theory and include the effects of the laser trapping forces on the Yb:YLF crystal, which acts as a spring at the end of the cantilever. With increased irradiances, due to the increased force constant of the spring, the eigenfrequency of the cantilever increases. Analytically the eigenfrequency ($f_i$) in hertz, of a uniform rectangular beam is given by:

$$f_i = \frac{1}{2\pi} \frac{\Omega_i^2}{L^2} \sqrt{\frac{EI}{\rho}}. \tag{1}$$

Here L is the length, ρ is the linear density, E is the Young's modulus, and I is the area moment inertia of the cross section of the beam. The $i^{th}$ eigenvalue of the non-dimensional frequency coefficient $\Omega_i$ satisfies the following equation for a uniform rectangular cantilever with a mass Mo and spring of spring constant K attached at the free-end of the cantilever of mass mo.

$$-\left(\frac{K}{\Omega_i^3} - \frac{\Omega_i M_0}{m_0}\right)[\cos(\Omega_i)\sinh(\Omega_i) - \sin(\Omega_i)\cosh(\Omega_i)] + \cos(\Omega_i)\cosh(\Omega_i) + 1 = 0. \tag{2}$$

In one embodiment, to experimentally probe the effects of the laser trapping forces, the power-dependent eigenfrequency measurements were performed at a constant cryostat temperature of 77 K. At temperatures as low as 77 K, the cooling efficiency of the Yb:YLF crystal decreases due to diminishing resonant absorption and red-shifting of the mean fluorescence wavelength. Due to negligible cooling with increased irradiance, and with the equilibrium temperature being maintained by the crysostat, it is assumed that any blue-shift in the eigenfrequency of the system was solely due to the greater laser trapping force at higher irradiance. Therefore, the excessive blue-shift at room temperature (6+/2.2 Hz) can be attributed to the change in Young's modulus due to cooling of the CdSNR cantilever. According to this calibration, the cantilever's temperature is reduced 15.4+/−5.6 K below room temperature. Since cantilever eigenfrequencies are calibrated at isothermal conditions, the temperatures measured via cantilever eigenfrequencies during laser-refrigeration do not directly measure the coldest point within the cantilever, but rather a lower bound of the absolute minimum achievable temperature decrease. This is a consequence of temperature gradients within the cantilever that lead to gradients of the cantilever's Young's modulus. Based on finite element eigenfrequency modeling of the cantilever with a spatially varying Young's modulus, the coldest point in the cantilever can be calculated.

Example

Heat Transfer Analysis

Below, a steady state, heat-transfer model of the laser-cooled cantilever system to quantify how thermal gradients within CdSNR cantilevers affect eigenfrequency measurements during laser cooling experiments is presented.

Figure 3A:
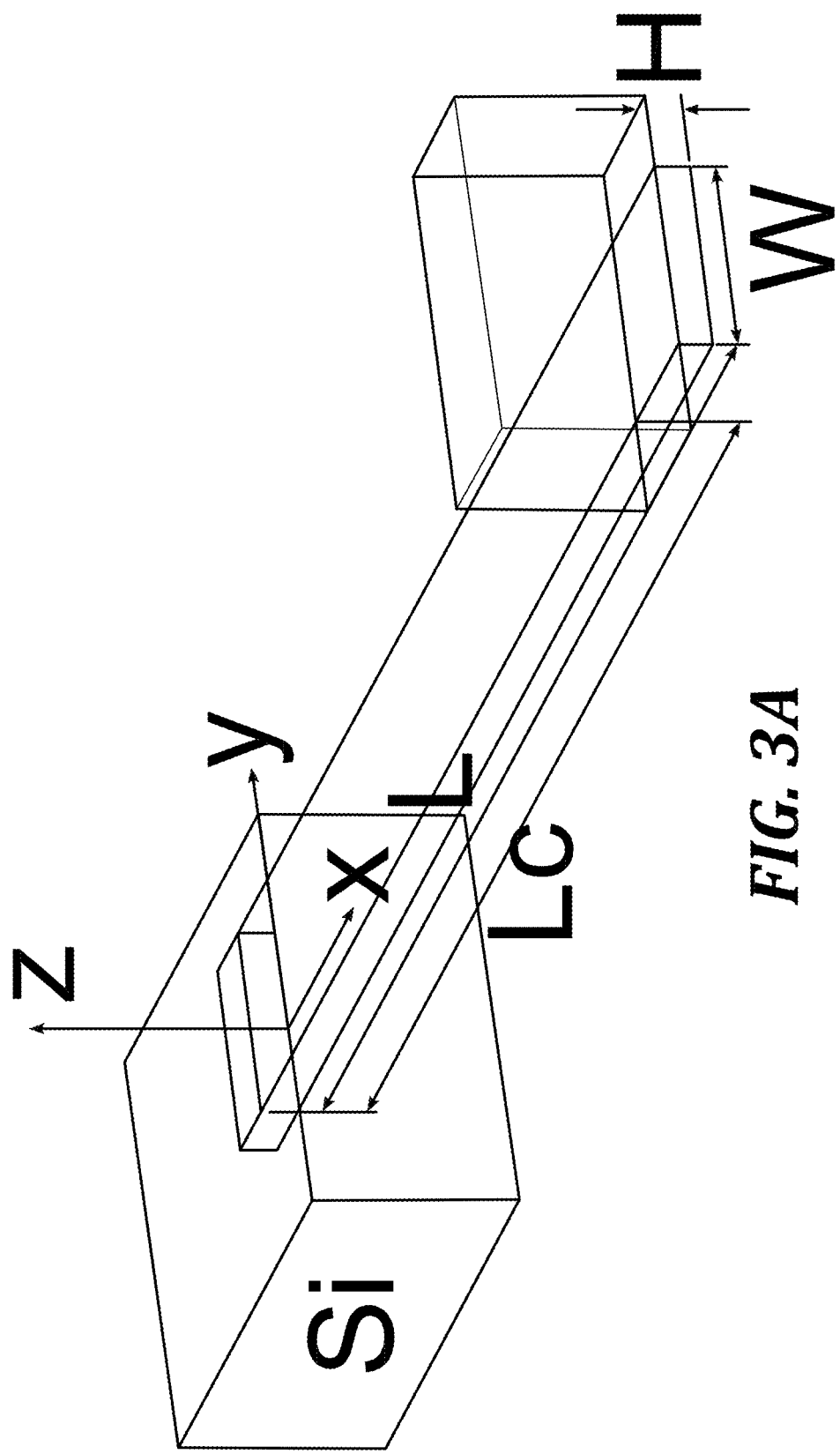
FIG. 3A is the geometry of an exemplary optomechanical resonator system used for analytical and finite element heat transfer modeling.
Figure 3B:
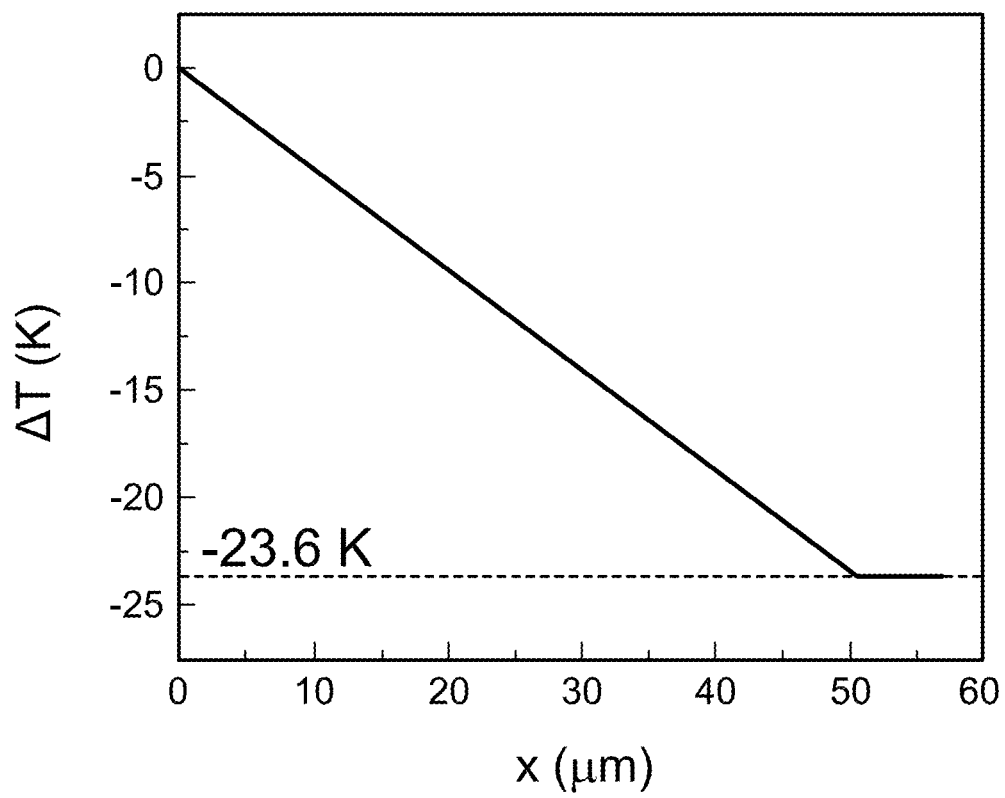
FIG. 3B is a graph of the steady state temperature along the length of an example cantilever in accordance with the present technology.

FIG. 3B is a graph of the steady state temperature along the length of an example cantilever (illustrated in FIG. 3A) in accordance with the present technology. On the horizontal axis is the position (x) along the length of the cantilever, where position x=0 is at the attachment end of the cantilever, attached to the substrate. On the vertical axis is the Temperature (T) in Kelvins. As the position along the cantilever is moved farther from the substrate, the Temperature drops, eventually leveling out at −23.6K.

The steady state temperature along the length of the CdSNR was calculated using analytical one-dimensional solution obtained assuming all of the cooling power produced by the YLF crystal flows through the CdSNR cross section at $L_c$.

The YLF crystal is approximated as a cuboid with sides of $H_c$=6, $L_c$=7.5 and $W_c$=6 µm, such that the volume and aspect ratio was similar to the tetragonal bi-pyramidal YLF crystal used experimentally.

At steady state, the temperature distribution in the nanoribbon satisfies the energy equation given by:

$$\frac{\partial^2 T}{\partial x^2} + \frac{\partial^2 T}{\partial y^2} + \frac{\partial^2 T}{\partial x^2} = 0. \tag{3}$$

Heat transfer to the surroundings by conduction and convection is absent due to the vacuum surrounding the cantilever. Radiant (blackbody) energy transfer to or from the surroundings is negligible due to the relatively low temperatures of the cantilever and its small surface area. Therefore, the heat flow within the cantilever is one-dimensional and equation (3) reduces to:

$$\frac{d^2 T}{dx^2} = 0, \tag{4}$$

which has the general solution:

$$T(x) = C_1 x + C_2. \quad (5)$$

Assuming negligible interfacial resistance between the cantilever and the underlying silicon substrate, the temperature at the silicon/CdS interface (x=0) is the cryostat temperature $T_0$. Consequently, the boundary condition at the base of the nanoribbon is $T(0)=T_0$. If all of the heat generated in the YLF crystal is transferred to or from the CdSNR across the interface at $x=L_c$, the heat flux at the interface is given by:

$$\kappa \frac{dT}{dx}(L_c) = \frac{\dot{Q}_c}{HW}, \quad (6)$$

in which $\dot{Q}'_c$ is the rate of heat removal from the YLF crystal, and $\kappa$ is the thermal conductivity of CdS.

Applying the boundary conditions, the temperature distribution in the CdSNR becomes:

$$T(x) = \frac{\dot{Q}_c}{\kappa HW} x + T_0. \quad (7)$$

It is assumed that the relatively large thermal conductivity of the YLF crystal (~6 W/m·K) will lead to a nearly uniform temperature in the crystal given by:

$$T(L_c) = \frac{\dot{Q}_c}{\kappa HW} L_c + T_0. \quad (8)$$

The local rate of laser energy absorbed per unit volume $Q''' = Q_{abs}/V$ is given by:

$$Q''' = \frac{4\pi n' n''}{\lambda_0 Z_0}(E \cdot E^*). \quad (9)$$

Here $n = n' - in''$ is the complex refractive index of the medium, $\lambda_0$ is the wavelength in vacuum, $Z_0$ is the free space impedance ($Z_0 = 376.73$ ohms), and $E^*$ is the complex conjugate of the local electric field vector within the YLF crystal. Upconverted, anti-Stokes luminescence follows laser absorption, cooling the crystal. The absorption of the incident laser by the underlying CdS cantilever is neglected due to its small thickness (154 nm) and low absorption coefficient at 1020 nm ($6.7 \times 10^{-13}$ cm$^{-1}$) relative to what has been reported for YLF (~1 cm$^{-1}$).

Given that eigenfrequency measurements can only provide a lower bound of the cantilever's temperature, a more direct approach must be used to measure the temperature at the end of the cantilever. Differential luminescence thermometry (DLT) can be used to measure the temperature of the YLF at the end of the cantilever based on using a Boltzmann distribution to analyze emission from different crystal field (Stark) levels. DLT was used to measure a temperature drop of 23.6 K below room temperature ($\Delta T_{max}$) at an irradiance ($I_0$) of 965 kW/cm$^2$ corresponding to an incident power $P_0=40.1$ mW and spot radius $w_0=1.15$ μm. Using the measured value of $T(L_c)-T_0=23.6$ K, $H=150$ nm, $W=2.5$ μm, $L_c=53$ μm, and $\kappa=20$ W/(m K), a cooling power of $\dot{Q}'_c = 3.34 \times 10^{-6}$ W is calculated. The resultant temperature gradient along the length of the device is shown in FIG. 3. Based on the temperature gradient, by modeling a spatially varying Young's modulus, the coldest point in the cantilever from eigenfrequency measurements was calculated to be between 26 and 58 K below room temperature. This agrees well with the coldest temperature measured using DLT.

An absorption coefficient and cooling efficiency of 0.61 cm$^{-1}$ and 1.5%, respectively, have been reported previously for a bulk YLF crystal doped with 10% Yb-ions. Based on this absorption coefficient, a Yb:YLF crystal with a thickness of 6 μm would generate, to first order, a maximum cooling power of 0.22 μW when irradiated by a pump laser with a power of 40.1 mW. This power is an order of magnitude smaller than the experimental cooling power reported above. The discrepancy can be explained by two factors related to the symmetric morphology of the YLF microcrystals. First, the size of the YLF microcrystals is within the Mie-regime for light scattering and internal optical fields may be enhanced considerably due to morphology dependent cavity resonances.

A modified Euler-Bernoulli model was used to account for the laser trapping forces, and the measured temperatures were validated using heat transfer theory. A maximum drop in temperature of 23.6 K below room temperature was measured near the tip of the cantilever.

The embodiments of the invention in which an exclusive property or privilege is claimed are defined as follows:

1. A method of indirectly cooling an optomechanical resonator, comprising impinging a laser on an optomechanical resonator attached to a substrate,
   wherein the optomechanical resonator comprises:
   a cantilever;
   a cooling end of the cantilever, comprising a laser-induced cooling element;
   wherein the laser induced cooling element comprises a microcrystal cooling material within the Mie-regime for light scattering; and
   an attachment end of the cantilever, attached to a substrate; and
   wherein the laser has a peak wavelength in the near-infrared band.

2. The method of claim 1, wherein the cantilever is formed from a material having an absorption coefficient of $6.7 \times 10^{-13}$ cm$^{-1}$ to 0.61 cm$^{-1}$ at the peak irradiance wavelength.

3. The method of claim 1, wherein the cantilever is formed from a material selected from the group consisting of CdS, $Si_3N_4$, and $SiO_2$.

4. The method of claim 1, wherein the cantilever has a flat, smooth surface.

5. The method of claim 1, wherein the laser-induced cooling element is attached to the cantilever by Van der Waals bonding.

6. The method of claim 1, wherein the laser-induced cooling element includes a material selected from the group consisting of Yb:YLiF$_4$, Yb:NaYF$_4$, Yb:LuLiF$_4$, Yb:KLuF$_4$, and Yb:KYF$_4$.

7. The method of claim 1, wherein the laser-induced cooling element has a flat surface.

8. The method of claim 1, wherein the optomechanical resonator is cooled greater than 20K.

9. The method of claim 1, wherein the laser has a peak wavelength in a range of about 1020 nm to about 1064 nm.

10. The method of claim 1, wherein the cooling results from emission of upconverted, anti-Stokes photoluminescence in the laser-induced cooling element.

11. An optomechanical resonator configured to indirectly cool via laser irradiance, the optomechanical resonator comprising:

a cantilever;

a cooling end of the cantilever, comprising a laser-induced cooling element;

wherein the laser induced cooling element comprises a microcrystal cooling material within the Mie-regime for light scattering; and an attachment end of the cantilever, attached to a substrate;

wherein the laser-induced cooling element is attached to the cantilever by Van der Waals bonding.

12. The optomechanical resonator of claim 11, wherein the cantilever is formed from a material having a low absorption coefficient at a peak wavelength.

13. The optomechanical resonator of claim 11, wherein the cantilever is formed from a material selected from the group consisting of CdS, $Si_3N_4$, and $SiO_2$.

14. The optomechanical resonator of claim 11, wherein the laser-induced cooling element includes a material selected from the group consisting of Yb:$YLiF_4$, Yb:$NaYF_4$, Yb:$LuLiF_4$, Yb:$KLuF_4$, and Yb:$KYF_4$.

15. The optomechanical resonator of claim 11, wherein the optomechanical resonator is configured to be cooled greater than 20K when impinged with laser irradiance.

16. The optomechanical resonator of claim 11, wherein the laser irradiance has a peak wavelength in a range of about 1020 nm to about 1064 nm.

17. The optomechanical resonator of claim 11, wherein the cooling results from emission of upconverted, anti-Stokes photoluminescence in the laser-induced cooling element.

* * * * *